Nov. 26, 1957 Y. PONSAR 2,814,306
LOW FRICTION VALVE
Filed May 15, 1952 4 Sheets-Sheet 1
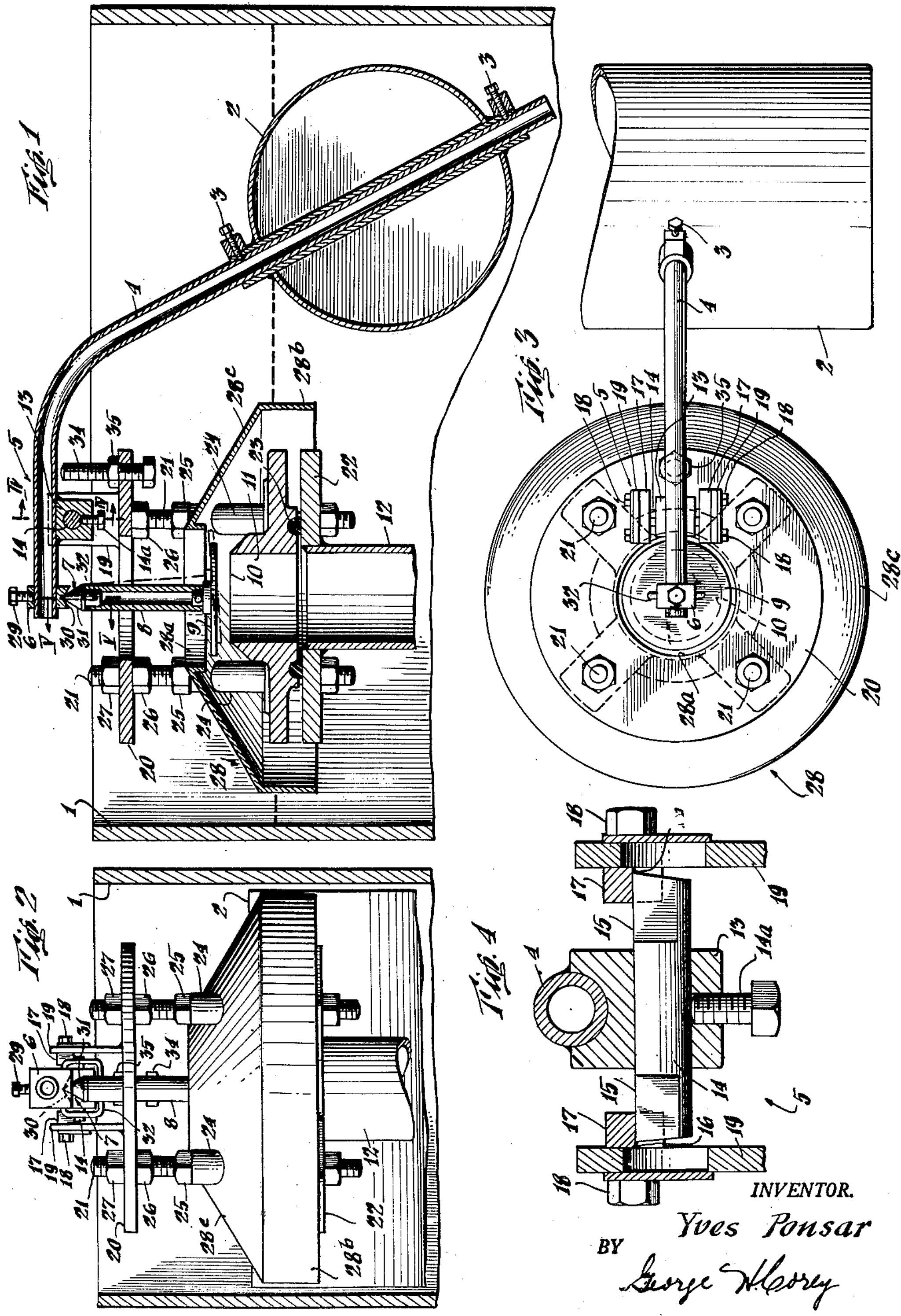
INVENTOR.
Yves Ponsar
BY George H. Corey
ATTORNEY Nov. 26, 1957 Y. PONSAR 2,814,306
LOW FRICTION VALVE
Filed May 15, 1952 4 Sheets-Sheet 2
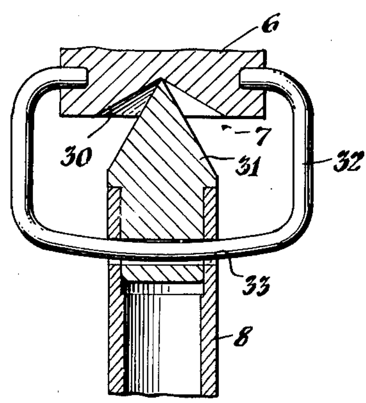
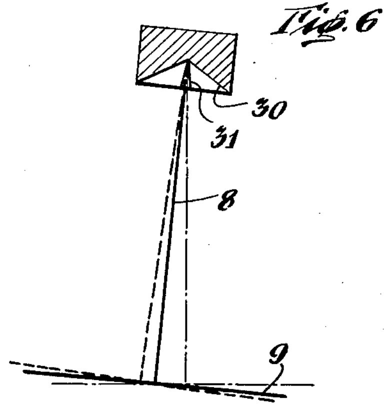
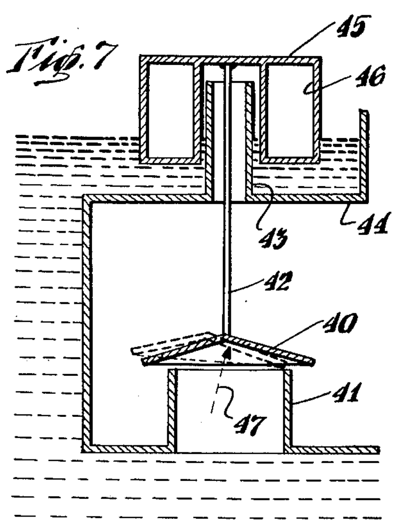
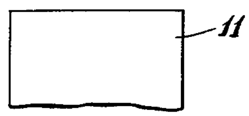
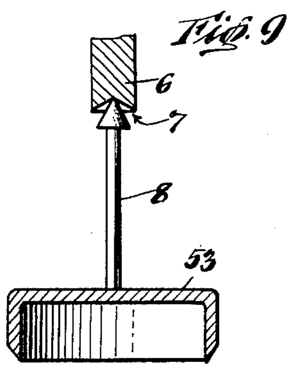
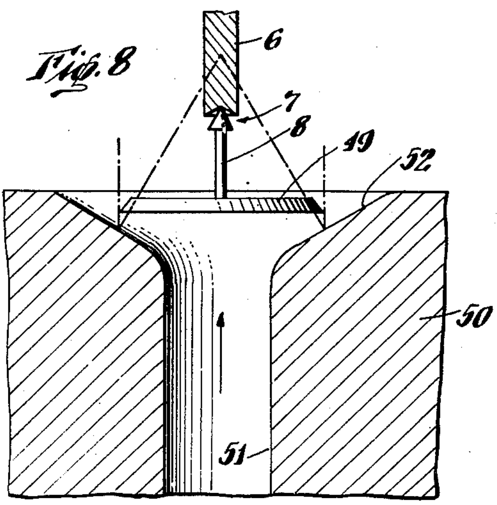
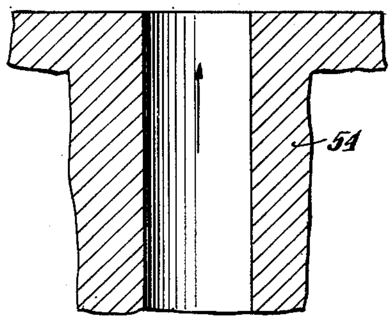
INVENTOR.
Yves Ponsar
BY George H. Corey
ATTORNEY Nov. 26, 1957 Y. PONSAR 2,814,306
LOW FRICTION VALVE
Filed May 15, 1952 4 Sheets-Sheet 3
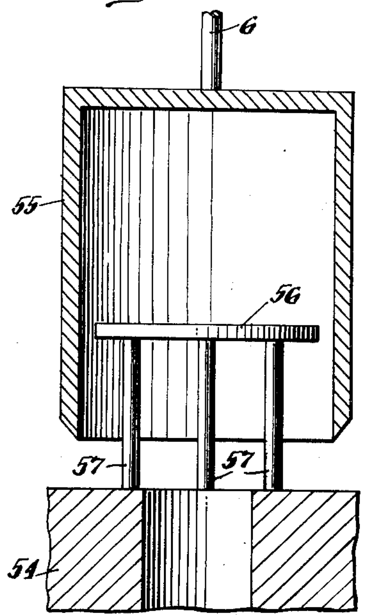
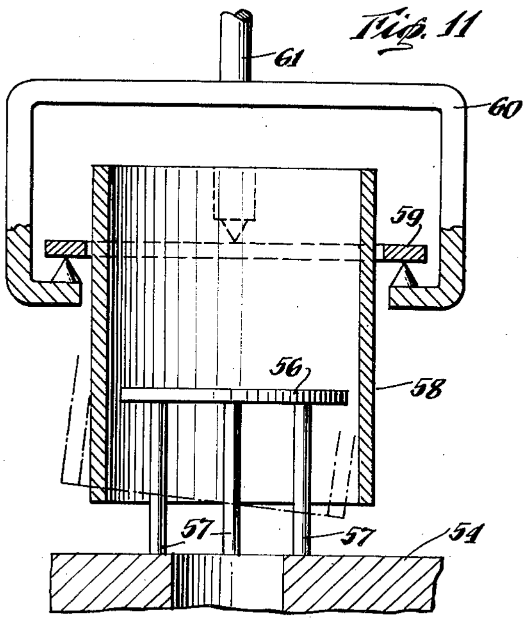
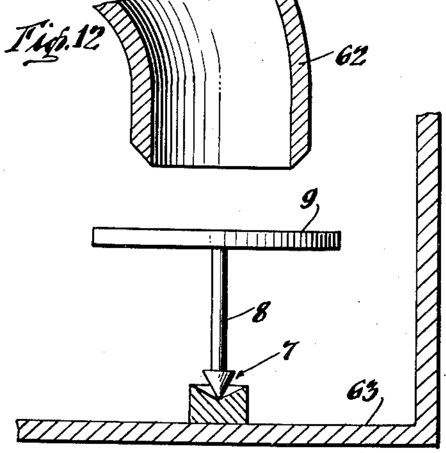
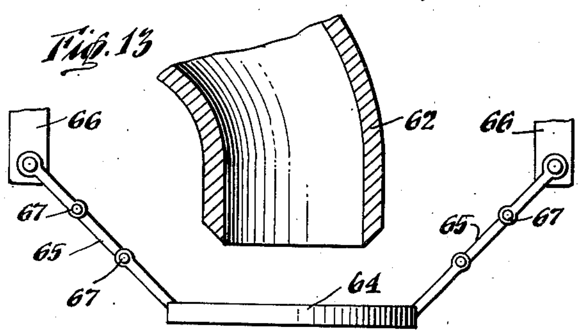
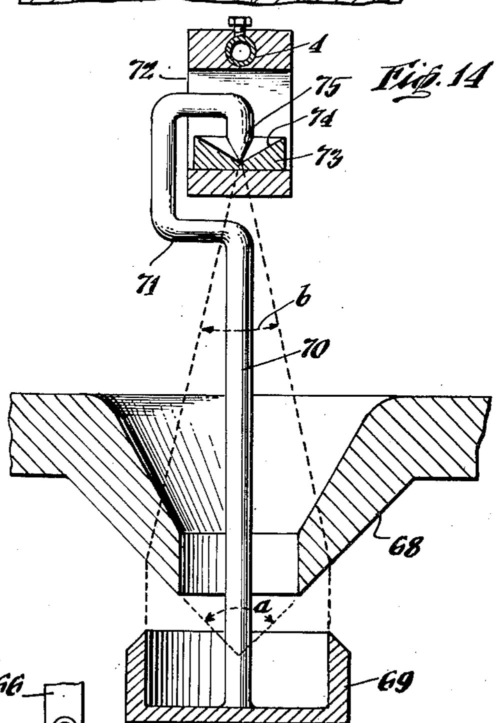
INVENTOR.
Yves Ponsar
BY
George H. Corey
ATTORNEY LOW FRICTION VALVE
Filed May 15, 1952 4 Sheets-Sheet 4
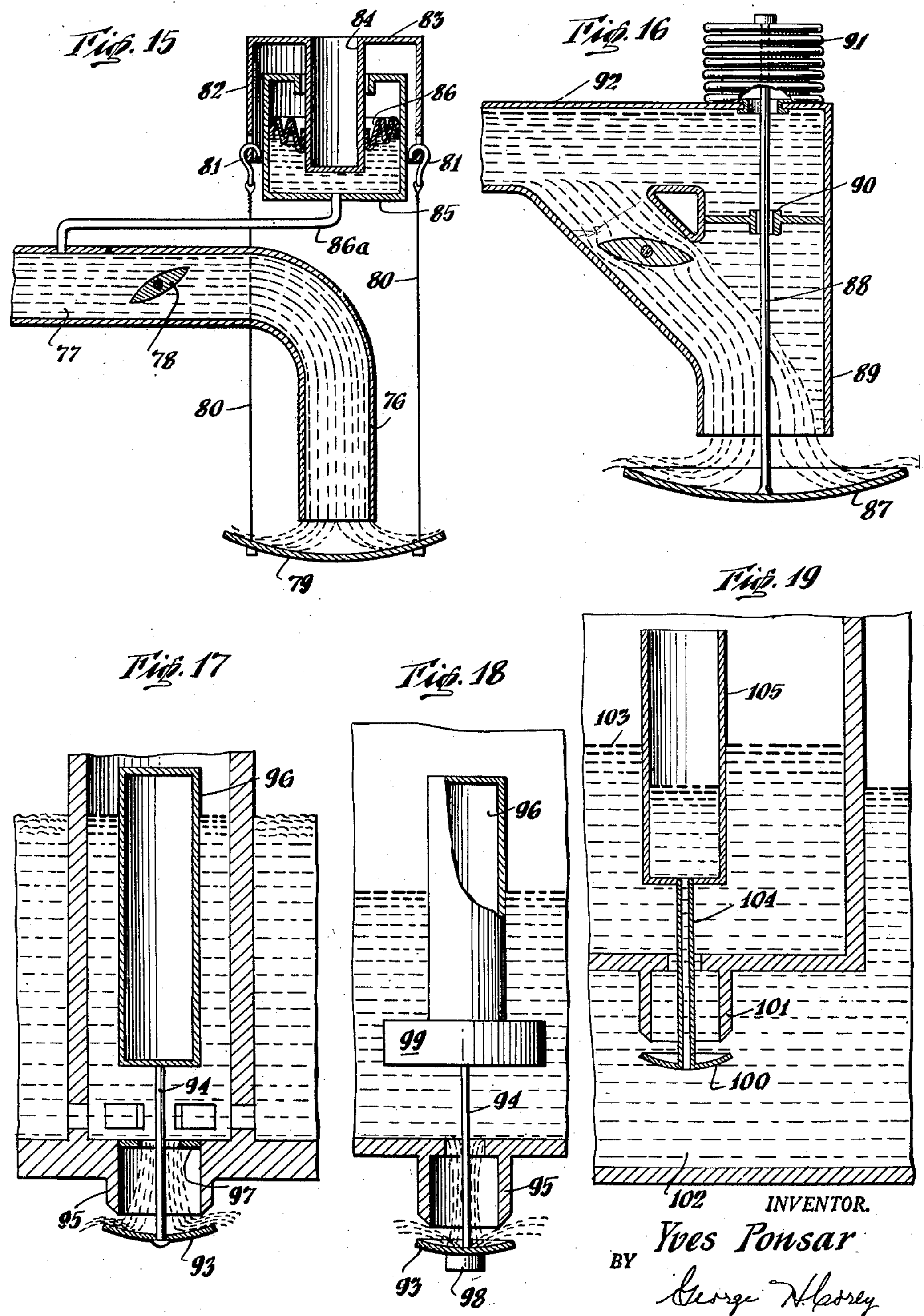
INVENTOR.
Yves Ponsar
BY George H. Corey
ATTORNEY United States Patent Office 2,814,306

Patented Nov. 26, 1957

2,814,306

LOW FRICTION VALVE

Yves Ponsar, Bois-Colombes, France, assignor to Etablissements Neyrpic, Grenoble, France, a corporation of France Application May 15, 1952, Serial No. 287,843

Claims priority, application France June 4, 1946

21 Claims. (Cl. 137—433)

The present invention relates to valves, and especially to valves which are so constructed as to be operable with a minimum of frictional resistance.

The present application is a continuation-in-part of my copending applications Ser. No. 751,667, filed June 2, 1947, now Patent No. 2,646,060, for Apparatus for Automatically Regulating the Flow of Fluids, and Ser. No. 178,818, filed August 11, 1950, now abandoned, for Self-centering Valve.

It is customary in constructing a valve to provide some structure for guiding the valve in its movement toward and away from its seat. The guiding structure usually takes the form of a stationary surface engaged by and more or less closely fitting a cooperating surface on the valve or its stem, so as to prevent any lateral movement between the valve and the stationary surface. Typically, the guiding structure may be a stationary sleeve encircling the stem of the valve and effective to keep it moving in a straight line.

Such guiding arrangements always introduce sliding friction between the stationary parts and the moving parts of the valve. Where the force available to operate the valve is limited, as when the valve is operated in response to a variable condition such as a pressure or liquid level, this friction results in a loss of sensitivity and sometimes in sticking of the valve.

It is an object of the present invention to provide a valve in which friction is minimized by guiding the valve without the use of relatively sliding surfaces.

Another object is to provide such a valve which is guided by forces developed by the fluid stream that is controlled by the valve.

Another object is to provide a valve which may be operated by a condition responsive device with a minimum of frictional resistance.

The foregoing and other objects of the invention are attained by providing a valve mechanism including three principal elements, namely: (1) a valve operator, which produces a valve positioning force, (2) a valve member cooperating with a seat to control a fluid flow, and (3) an operative connection between the operator and the valve member. All three of the principal elements offer relatively low friction between moving parts.

Several low friction valve operators are shown and described herein, including a float, a flexible bellows, and a piston movable within a cylinder and connected to the cylinder wall by a flexible diaphragm. The term "low friction valve operator," as used in this specification, is intended as a generic term inclusive of the several operators shown and mechanical equivalents thereof.

Several low friction valve members are also shown and described herein. In all of them, the valve seat is the end of a vertically (either upwardly or downwardly) directed nozzle. The valve member itself has a diameter substantially larger than that of the nozzle and moves in a substantially vertical direction to control the flow. The valve member is supported so that it may move laterally through a substantial but limited range with respect to the nozzle without any restraint imposed by the valve supporting structure. This lateral movement is typically a swinging motion throughout the normal movements of the valve. The nozzle and the movable valve member are so constructed that whenever the valve member departs laterally from a normal position with respect to the nozzle axis, a dynamic force is applied to the valve by the fluid passing through the nozzle, said force acting in a direction to restore the valve member to its normal position.

Two types of such dynamic restoring or guiding forces are described herein. In one type, a thrust force due to the action of the jet of fluid issuing through the nozzle and impinging on the valve and a reactive force acting through the valve supporting structure combine to form a restoring or guiding couple when the valve departs from a neutral position.

The other type of restoring or guiding force is produced when the valve and nozzle are contoured with respect to the path of lateral movement of the valve so that a movement of the valve along that path away from a neutral position makes the discharge opening of the valve wider on the side toward which the valve moves and narrower on the opposite side. Under such conditions, the fluid issuing laterally from the valve applies to the valve a lateral thrust, acting in a direction to restore it to the neutral position.

The term "dynamically guided valve," as used in this specification, is intended as a generic term inclusive of all such valves shown and described herein, and mechanical equivalents thereof.

Two typical low friction connections between valve operators and valve members are disclosed herein.

One such connection comprises a lever rigidly connected at one end to the valve operator and supported at an intermediate point on a knife-edge pivot. The other end of the lever is connected through a cone-and-crater universal joint to the stem of the valve member. All moving parts are spaced from all adjacent stationary parts with which they might have a surface contact. The universal joint permits the lateral movement of the valve member which is necessary to produce the guiding force.

The other low friction connection is simply a rigid rod connected between a float and a valve member operated thereby. The entire assembly moves as a unit and is normally spaced from all adjacent stationary parts. The assembly may be translated horizontally and may also be laterally tilted to secure the lateral movement of the valve member to produce the guiding force.

The term "low friction connection," as used in this specification, is intended as a generic term inclusive of both types of connections disclosed and mechanical equivalents thereof.

Other objects and advantages of my invention will become apparent from consideration of the following description, taken together with the accompanying drawings.

In the drawings:

Fig. 1 is a cross-sectional, elevational view of a float-operated, low friction valve embodying the principles of the invention.

Fig. 2 is an elevational view of the valve shown in Fig. 1.

Fig. 3 is a plan view of the valve of Figs. 1 and 2.

Fig. 4 is a fragmentary cross-sectional view taken on the line IV—IV of Fig. 1, on an enlarged scale.

Fig. 5 is a fragmentary cross-sectional view taken on the line V—V of Fig. 1, on an enlarged scale.

Fig. 6 is a somewhat diagrammatic view illustrating the operation of the valve of Figs. 1 to 5 under certain conditions.

Figs. 7 to 19 are cross-sectional views respectively illustrating other embodiments of the invention.

*Figs. 1–6*

These figures illustrate an inlet valve mechanism controlling the flow into a tank 1, having its upper end open to the atmosphere. The valve mechanism is operated by a float 2, adjustably fastened by set screws 3 on one end of a curved balance lever 4.

The lever 4 is balanced at an intermediate point on a knife edge pivot generally indicated at 5, and its opposite end carries a block 6 having formed in its under surface a crater 30 which is part of a universal joint 7. The other part of the joint is a cone 31 attached to the stem 8 of a valve member 9. The valve member 9 cooperates with a seat 10 formed on the end of a nozzle 11 mounted on the upper end of an inlet conduit 12. The valve 9 is somewhat larger in diameter than the nozzle opening.

The knife edge pivot 5 (see Fig. 4) includes a block 13 attached, as by welding, to the lever 4 and having a transverse aperture through which is inserted a pivot pin 14 having the upper sides of its ends sharpened to form knife edges, as shown at 15. The ends of the knife edges 15 engage in V-shaped grooves 16 formed on the under sides of bearing blocks 17 which are attached by bolts 18 to stationary supports 19. The pivot pin 14 is adjustably fastened in the block 13 by means of a set screw **14*a***.

The supports 19 are mounted on an annular plate 20, which is in turn mounted on four through bolts 21 attached at their lower ends to a flange 22 welded on the upper end of the inlet conduit 12.

The nozzle 11 is supported on the upper surface of flange 22, and is apertured to receive the through bolts 21. A gasket 23 is provided between the nozzle 11 and the flange 22. Above the nozzle 11, the through bolts are encircled by sleeves 24, which may be tightened down against the nozzle 11 by means of nuts 25 threaded on the through bolts. The through bolts carry another set of nuts 26 which support the plate 20 and still another set of nuts 27 for holding the plate 20 in place.

The annular shield 28 is also mounted on the through bolts 21. The shield 28 includes an inner vertical flange **28*a* and an outer vertical flange 28*b*, connected at their upper ends by a frusto-conical section 28*c***.

The block 6 is adjustable on the end of lever 4 by means of a set screw 29. The cone 31 and crater 30 are loosely held against separation by means of a bail 32 (see Fig. 5) which has its ends rotatably mounted in sockets formed in the block 6, and has its bight passing loosely through a suitable aperture 33 in the stem 8. Fig. 5 shows the position of the valve stem and the cone 31 when no pressure is being applied to the valve member 9 or stem 8 through nozzle 11. Therefore, the bail 32 bears against the upper side of aperture 33 so as to maintain the proximate contact of the cone 31 and crater 30. When pressure is applied to the valve member 9, the stem 8 moves upward slightly so that bail 32 does not contact either the upper or lower part of aperture 33. In this position there is no resistance to the pivotal movement of the stem along the bail.

The nozzle 11 is shown as having a sharp edge. The provision of a sharp edge increases the freedom of the swinging movement of the valve member 9, especially when it is nearly closed, since it increases the angle through which the valve can swing before it strikes the edge of the nozzle.

*Operation—Figs. 1–6*

As the water level rises in the tank 1, the float 2 rises rotating lever 4 counter-clockwise on the pivot 5, and thereby moving the valve member 9 downwardly toward closed position. When a certain maximum level is reached, the valve 9 is completely closed against the seat 10 on the end of nozzle 11. The maximum level may be adjusted by changing the position of the float 2 along the lever 4 by means of the set screws 3. As the level in the tank falls the float 2 moves downwardly, allowing the valve 9 to be opened by the pressure in nozzle 11. The upward movement of the valve is limited by a stop bolt 34 threaded in the plate 20 and projecting upwardly under the lever 4. A lock nut 35 is provided to fasten the stop bolt 34 in any adjusted position.

If the level in the tank continues to fall after lever 4 engages stop bolt 34, then bolt 34 acts as a fulcrum, and the weight of the float 2 provides a torque which holds the knife edges 15 in the grooves formed in the bearing blocks 17.

The valve stem 8 and the lever 4 are connected through the cone-and-crater universal joint 7 and are supported on the stationary parts of the apparatus by means of the knife edge pivot. Friction at the joint 7 and the pivot 5 is minimized, since the relatively movable parts are limited to line or point contacts with one another. There are no surface contacts either between the movable parts or between any movable part and a stationary part. The movable parts are spaced from all stationary parts with respect to which they are linearly movable. The only contact between stationary and movable parts is at the apex of the knife-edge pivot, where the relative movement is rotary, not linear. As the valve member moves vertically with respect to the seat 10, it must be guided so that it will seat properly when it is closed and so that it will properly restrict the flow when it is partly open.

This guiding action is secured by means of dynamic forces derived from the jet of fluid, for example, water, which issues from the nozzle 11. Two different types of guiding forces are effective in this modification of the invention.

The first type of guiding force is a couple comprising a thrust force due to the upwardly directed jet and a downwardly directed reaction force transmitted through the universal joint 7. The thrust force produced by a jet impinging on a flat surface may be considered as acting on a line through the center of the jet and perpendicular to the surface on which it impinges. When the valve member 9 is in the position shown in full lines in Fig. 1, this thrust force is directed vertically upward at the center of the valve member. The reaction force opposing that thrust is directed vertically downward through the universal joint 7, along the axis of the valve member 9. These two forces are then equal and directly opposite.

If the valve for any reason swings laterally away from the full line position of Fig. 1, for example, in a counter-clockwise direction to the position shown in dotted lines in that figure, then the line of action of the thrust force remains perpendicular to the face of the valve member 9, but the point where it acts on the valve member is shifted to the left with respect to the center of the valve member, since that point always remains aligned with the axis of nozzle 11. The reactive force remains aligned with the axis of the valve member, so that the two forces are parallel and have their lines of action spaced apart. These two forces therefore constitute a couple tending to rotate the valve member in a clockwise direction, so as to restore it to its full line position.

The farther the valve member swings from its full line position, the greater becomes the distance between the lines of action of the two forces, so that the rotating torque tending to return the valve to its normal position is increased.

When the valve swings so far to one side that its edge starts to pass the opening in the nozzle 11, the thrust force is decreased, since some of the water then escapes from the nozzle without impinging upon the valve member 9. However, the valve member can continue to move laterally beyond such a position for a substantial distance without changing the direction of the restoring couple. As long as a substantial portion of the valve area remains aligned with the nozzle, the restoring couple continues to act in the same sense with a substantial torque. In the arrangement shown, the lateral swinging movement of the valve member 9 is limited by its engagement with the sleeves 24.

The type of guiding force just described is hereinafter termed the "guiding couple." A position of the valve member wherein the two forces which make up the couple are equal and opposite will be hereinafter referred to as a neutral position of the valve with respect to the guiding couple.

The second type of guiding force acting on the valve member 9 is derived from the reaction of the water as it issues radially through the discharge opening between the valve member 9 and the nozzle 11. It is well known that fluid flowing through a divergent conduit, exerts a reactive force on the conduit wall in a direction opposite to the direction of flow. Similarly, fluid flowing through a convergent conduit exerts a reactive force on the conduit wall in the direction of flow.

The valve member 9 is symmetrical with respect to its axis and the nozzle 11 is likewise symmetrical with respect to its axis. Consequently, when the two axes are aligned, the valve member and the nozzle define a peripheral discharge opening which has the same radial contour throughout the nozzle periphery. Any reactive force exerted on the valve by the water passing through the discharge opening is exerted symmetrically about all sides of the valve, and the valve is balanced with respect to such forces.

When the valve member swings from its full line position, in Fig. 1, for example, to the dotted line position in that figure, the discharge opening becomes wider on the side toward which the valve swings and narrower on the opposite side. The reaction of the water on the side of the valve member where the opening is increased is analogous to that of the water flowing through a divergent conduit, whereas the reaction of the water on the side of the valve member where the opening is decreased is analogous to that of the water flowing through a convergent conduit. In the present case, both of these reactive forces are exerted on the valve in a direction to restore it to its normal position.

The type of guiding force described immediately above is hereinafter termed the "lateral guiding force." A position of the valve member wherein the net lateral guiding force is zero is hereinafter referred to as a neutral position of the valve with respect to the lateral guiding force.

Both types of guiding forces become very small as the valve approaches its full line position and disappear when the valve reaches that position. Consequently, in order that any appreciably guiding effect may be obtained, it is necessary that the valve be given a substantial amount of freedom of movement laterally with respect to the nozzle axis. It is also necessary that the discharge path of the water leaving the valve laterally be substantially symmetrical about the nozzle axis for a considerable distance, so that the guiding of the valve will not be upset by flow restrictions or by turbulence caused by changes in the direction of the flow. In other words, the nozzle must discharge into a space which is sufficiently large to avoid unsymmetrical back pressure effects which might disturb the guiding of the valve. The shield 28 provides a protection against accidental disturbence of the discharge from the valve by any external means.

The valve position shown in full lines in Fig. 1 is a neutral position with respect to both the guiding couple and the lateral guiding force. It is therefore a position of lateral equilibrium of the valve. It is not necessary however, that the two neutral positions coincide. If they do not, the position of lateral equilibrium of the valve does not coincide with either neutral position.

Fig. 6 illustrates an example of such a condition. In Fig. 1, it may be seen that the universal joint 7 moves along a curved path having its center on the knife edge pivot 5. The curvature of this path tends to shift the valve member 9 laterally as it moves toward and away from the valve, so that its center is not always in alignment with the nozzle 11. The guiding action which takes place on the valve under such conditions is illustrated diagrammatically in Fig. 6.

Under these conditions, as long as the valve has its center aligned with the jet axis, then the guiding couple due to the jet thrust and the reactive force is zero since the lines of action of those two forces coincide. Such a condition exists when the valve is in the left hand dotted line position of Fig. 6. The lateral guiding force due to the relative divergence of the opposite sides of the discharge opening, however, is not then zero, but is acting to swing the valve to the right so as to make the discharge opening symmetrical. Since there is then no opposition from the guiding couple, the valve moves to the right. As it moves in that direction, the guiding couple becomes effective in an opposing sense. When the full line position in Fig. 6 is reached, the torques of the guiding couple and of the lateral guiding force are equal and opposite, so that the valve is then in a position of equilibrium. If the valve moves beyond the full line position, then the lateral guiding force decreases, reaching zero at the right-hand dotted line position of Fig. 6. The restoring couple is then unopposed and is effective to return the valve toward its equilibrium position.

From the foregoing, it may be seen that it is not necessary that the pivot point of the valve remain aligned with the nozzle axis at all times. It may be shifted from that axis by a substantial amount and the valve will still be effectively guided to maintain it substantially in alignment with the nozzle.

As long as the pivot point remains aligned with the nozzle axis, gravity tends to aid the guiding forces in keeping the valve centered on that axis.

In the present specification, the term "lateral movement" is used as a generic term inclusive of a swinging movement as illustrated in the case of the valve of Fig. 1, for example, and a horizontal translation as illustrated in the case of the valve of Fig. 7, for example. The term "swinging movement" is used as a generic term inclusive of a circular or sperical movement in which all parts of the valve move about one center, such as takes place in the case of the valve of Fig. 1, and a similar movement in which different parts of the valve move about different centers, as in the case of the valves of Figs. 14 and 16.

In order to produce the guiding couple, which is mentioned above as the first type of guiding force, the contour of the valve face must be symmetrical about the center of the valve and the valve supporting structure must be arranged so that the line of action of the resultant reactive force must also extend through the center of the valve. In other words, the valve stem structure and the support for it must be symmetrical with respect to the valve axis.

The conditions necessary to produce the second type of guiding force mentioned above, sometimes referred to as the lateral reaction force, are that the nozzle must be symmetrical about its axis and the portion of the valve aligned with the nozzle when the valve is in its neutral position with respect to the lateral reaction force must also be symmetrical about the nozzle axis. Furthermore, in order to increase the width of the discharge opening on the side towards which the valve moves and decrease the width on the opposite side, three factors must be correlated, namely the valve contour, the nozzle contour and the path of lateral movement of the valve. In the valve of Fig. 1, the nozzle is sharp-edged, the valve face is flat and the valve swings about a center located on the opposite side of the valve from the nozzle. Any of these three factors may be varied without adversely affecting the result, as will be pointed out in connection with some of the other modifications described hereinafter, providing the conditions described above with reference to the opening width variations on the opposite sides of the valve are met.

*Fig. 7*

In this figure there is illustrated a conical valve member 40 which cooperates with an upwardly directed nozzle 41. The valve member 40 is downwardly concave. A stem 42 is attached to the center of valve 40 and extends upwardly through a sleeve 43 which projects upwardly through a liquid container 44. The upper end of stem 42 extends through the open upper end of the sleeve 43 and is attached to a place 45 which forms the top of an annular float 46. The float 46 is positioned in accordance with the liquid level in the container 44.

The nozzle 41 is illustrated as being an outlet for the container 44. The valve 40 is opened as the float 46 rises with the liquid level, and closes as the liquid level falls. The nozzle 41 may alternatively be supplied with fluid from any other source.

In Fig. 7, there are no relatively movable parts in the valve and its operating mechanism. The valve 40, the stem 42 and floats 46 form a unitary assembly. Furthermore, all the moving parts are spaced from all the stationary parts as long as the valve is off its seat. Consequently, there is practically no frictional resistance to movement of the valve.

The valve 40 may move laterally either by swinging about the center of gravity of the moving assembly, or the whole assembly may be translated horizontally through the distance permitted by the space between the stem 42 and sleeve 43.

If the valve 40 swings laterally from the position shown in Fig. 7, dynamic guiding forces are produced in a manner analogous to that discussed in detail in connection with Figs. 1 through 6. The only material change in the guiding forces from those present in the modification previously described is in the direction of the component of the guiding couple due to the thrust of the fluid jet against the valve.

The thrust on the valve member acts in a direction parallel to the mean perpendicular to that portion of the valve member surface on which the jet impinges. In the case of Fig. 1, where the valve member is flat, the resultant thrust always acts perpendicular to the valve surface at the point aligned with the nozzle axis. In Fig. 7, if, for example, the valve 40 swings counter-clockwise about the center of gravity of the moving system, or to the left in Fig. 7, then the portion of the valve 40 which is aligned with the nozzle is no longer symmetrical with respect to the nozzle axis. The resultant thrust acting on the valve still acts at the point on the valve aligned with the nozzle axis, but the resultant is not perpendicular to the surface at that point, because the surface subject to the thrust is not symmetrical about that point. A larger proportion of the valve surface subject to the thrust is located to the right of the valve center, while a smaller proportion is located to the left of the valve center. The direction of the resultant is therefore displaced from the perpendicular at the point on which it acts in a sense toward the perpendicular on the opposite side of the valve center. For example, if the valve moves to the dotted line position of Fig. 7, then the resultant thrust acts in the direction indicated by the arrow 47. It may be seen that the line of action of the force is displaced from the vertical in a direction to apply to the valve a component force acting to the right in Fig. 7, or in a direction to restore the valve to its central position.

When the valve 40 is translated horizontally from its central position, the resultant thrust force is similarly displaced from its normal angular relationship with respect to the surface on which it acts, so as to provide a restoring component of force. Under these conditions, the lateral reaction force acts in the same manner as it did in Fig. 1. The restoring couple is ineffective to translate the valve horizontally back toward its central position, but instead is effective, as in the previous case, to produce a swinging movement of the valve towards its central position. The guiding forces as a whole are effective to keep the valve 40 centered on the nozzle axis and also to keep the valve assembly vertical.

*Fig. 8*

This figure illustrates a valve similar to that of Fig. 1 applied to a modified form of nozzle. In this figure those parts which correspond to their counterparts in Fig. 1 have been given the same reference numerals as the corresponding parts in Fig. 1 and will not be further described. The valve 49 in this figure has a sharp edge and cooperates with a nozzle 50 including a straight cylindrical passageway 51 opening into a widely divergent terminal passage 52 having a conical contour. The valve 49 has a diameter greater than the smallest diameter of the nozzle opening, and seats against the divergent passage 52.

Where this form of nozzle is used, it is essential that the pivot point of the valve be located below the intersection of the perpendiculars drawn from the conical surface at the points where it is engaged by the periphery of the valve member 9. This relationship is necessary in order to secure an increase in the width of the discharge opening on the side toward which the valve swings.

If this relationship obtains, then the guiding action is essentially the same as that described above in connection with Figs. 1 through 6.

*Fig. 9*

This figure illustrates a downwardly opening cup-shaped valve member 53 cooperating with an upwardly opening nozzle 54 having a surface extending horizontally a substantial distance from the nozzle opening. The valve member 53 has a sharp edge. The guiding forces present in the case of this valve are analogous to the forces present in the valve of Fig. 1.

*Fig. 10*

This figure illustrates a valve in which the vertical thrust due to the dynamic action of the flow of fluid is completely suppressed. The only centering action taking place in this form of valve is the lateral reaction force.

Fig. 10 shows a downwardly opening cup-shaped valve 55 which is considerably deeper than the similar valve 53 of Fig. 9. The nozzle 54 is the same as the nozzle of Fig. 9. Above the nozzle 54, a fixed jet suppressor plate 56 is supported on spaced posts 57 and extends within the cup-shaped valve 55.

Any upward thrust due to the fluid passing through the nozzle 54 is dissipated by the plate 56. All the fluid discharged through the nozzle must pass through the lateral discharge opening between the edge of the valve and the nozzle, where it produces a centering action similar to the lateral reaction force described in connection with Fig. 1.

The valve 55 may be subjected to an upward force due to the static pressure of the water or other fluid passing through the nozzle 54, but it is not subjected to any thrust due to the change in direction of the fluid in passing through the valve.

*Fig. 11*

This figure illustrates a further modification of the valve of Fig. 10 in which the effect of the static pressure of the fluid in the jet is completely eliminated. In Fig. 11, the nozzle 54, the jet suppressor plate 56 and the posts 57 are the same as the corresponding parts in Fig. 10. A cylindrical valve member 58 is provided, which is supported on a Cardan ring arrangement shown at 59. The Cardan ring is in turn supported by a frame 60 attached to a stem 61, which may in turn be supported by structure similar to that of either Fig. 1 or Fig. 7.

The valve 58 must be sufficiently long so that the liquid within it will not rise and flow out through the top.

In other words, the length of the valve 58 must be greater than the static pressure head within the passage of nozzle 54.

As in the case of Fig. 10, the centering action due to the guiding couple is completely eliminated, and the only centering action is that due to the lateral reaction force.

In this figure, the valve 58 is not sharp-edged, and it may be seen that when the valve member moves laterally from its normal position, for example, to the dotted line position shown, the discharge opening actually becomes radially divergent on the side toward which the valve moves, and radially convergent on the opposite side.

*Fig. 12*

This figure shows an arrangement employing a downwardly directed nozzle 62. The valve member 9 and its immediately adjacent supporting parts are the same as in Fig. 1, except that they are inverted. The universal joint 7 is supported by a frame 63 which extends upwardly on either side of the valve and may be connected at its upper end to a stem (not shown) such as the stem 61 of Fig. 11.

In this modification, the force of gravity does not aid in guiding the valve member, but instead has a tendency toward instability. However, the guiding forces due to the dynamic action of the jet are sufficient to overcome the adverse effect of gravity.

*Fig. 13*

This figure shows another arrangement using the downwardly directed nozzle 62 and a valve member 64, supported in a manner somewhat different from any of the preceding valves. The valve 64 is supported by a number of peripherally spaced links 65, which are symmetrically arranged with respect to the valve member. The links 65 extend upwardly and outwardly from the valve member and are attached at their upper ends to supports 66. Supports 66 are all connected to a common operating mechanism (not shown) for opening and closing the valve. The links 65 may be articulated as shown at 67.

With this type of suspension, each point on the valve swings about a different center. Except for those points on the valve which are immediately connected to the links, all points on the valve rotate about instant centers which move as the valve moves.

The guiding forces in this type of valve are the same as those on the valve in Fig. 1. The guiding couple acts in the same manner and the lateral guiding force also acts in the same manner. It should be noted that this type of suspension is effective when the valve moves laterally from its central position to widen the discharge opening on the side toward which it moves and to narrow the discharge opening on the opposite side.

*Fig. 14*

This modification includes a downwardly directed nozzle 68 having a convergent conical exterior surface and cooperating with an upwardly opening cup-shaped valve member 69. The valve member 69 is attached at its center to a stem member which extends upwardly through the nozzle and is formed at its upper end with a loop 71 extending around the side of a frame 72, which supports a block 73 having a crater 74 formed in its upper surface. The extreme upper end of the stem 70 is directed downwardly into the crater and has a conical tip 75. The valve member 69 is supported for universal movement about the point of engagement of the tip 75 with the crater 74. The frame 72 is carried by a lever 4 which may be similar to the lever 4 of Fig. 1.

With the valve and nozzle arrangement of Fig. 14, it is necessary that the apex angle *a* of the conical surface of nozzle 68 be greater than the apex angle *b* at the tip of the imaginary cone whose base is defined by the circle where the edge of valve 69 engages the nozzle 68 and whose tip is located at the bottom of crater 74. If this relationship between these angles is maintained, then the swinging movement of the valve will increase the width of the discharge opening on the side toward which it moves and decrease the width of the discharge opening on the opposite side.

The guiding forces acting on the valve of Fig. 14 are the same as those acting on the valve of Fig. 1.

*Fig. 15*

This figure illustrates a somewhat different type of valve member which cooperates with a downwardly directed nozzle. This valve member is part of a flow regulating system which is described more fully and claimed in my copending application Ser. No. 751,667, previously mentioned.

In Fig. 15, a nozzle 76 is supplied with fluid by a conduit 77 including a variable restriction 78.

On the discharge side of the nozzle 76 is located a valve member 79 having its upper surface concave. The valve member 79 is supported on a number of peripherally-spaced cables 80, whose upper ends are attached to hooks 81 engaging the lower end of a cylinder 82. The upper end of cylinder 82 is connected by a horizontal plate 83 to a piston 84 which moves within another cylinder 85. The piston 84 and cylinder 85 are connected by a flexible, annular diaphragm 86. The space within the cylinder 85 below the piston 84 is connected through a conduit **86*a* to the conduit 77 on the upstream side of restriction 78**.

The centering forces acting on the valve 79 are essentially the same as those described above in connection with Fig. 1. With this construction of the valve, each point on the valve swings laterally about a different center, in a manner similar to that of the valve in Fig. 13. The arrangement is such that the discharge opening is made more divergent on the side toward which the valve moves and less divergent on the opposite side. In order to secure this result with this arrangement, it is essential that the radius of curvature of the valve face be less than the radius of the swinging movement.

*Fig. 16*

This figure illustrates an upwardly concave valve 87 similar to the valve 79 in Fig. 15. The valve member 87 is connected at its center to a stem 88 which extends upwardly through a nozzle 89 and a sleeve 90, and has its upper end attached to the free end of a flexible bellows 91. The opposite end of the bellows 91 is mounted on a fixed support. In the structure shown, this fixed support is one wall of a conduit 92 leading to the nozzle 89, and the interior of the bellows is subject to the pressure in conduit 92.

The centering forces acting on valve 87 are the same as in the case of Fig. 1. The bellows 91 provides a universal support for the upper end of stem 88, allowing the valve 87 to swing laterally through a distance determined by the internal diameter of sleeve 90.

In this arrangement, as in the arrangement of Fig. 15, the radius of curvature of the upper surface of the valve member 87 must be smaller than the radius of the swinging movement of the valve. If this condition is met, the structure will produce the lateral guiding forces described above.

*Fig. 17*

Fig. 17 shows an upwardly concave valve member 93 attached to a central stem 94 which extends upwardly through a nozzle 95 and is attached at its upper end to a float 96. The float 96, stem 94, and valve 93, move as a unitary assembly. The centering action in this modification is the same as that described above in connection with Fig. 7.

Note that the valve 93 is capable not only of a swinging movement about the center of gravity of the moving assembly, but is also capable of horizontal translation through a distance determined by difference between the diameter of stem 94 and the diameter of an aperture formed in an orifice plate 97, through which the stem 94 passes.

*Fig. 18*

This figure illustrates an arrangement very similar to that of Fig. 17. The corresponding parts have been given the same reference characters in the two figures. In Fig. 18 a weight 98 is attached to the bottom of the valve 93 and an auxiliary float 99 is attached to the float 96. The purpose of the weight is to lower the center of gravity of the assembly, and the purpose of the float 99 is to raise the center of buoyancy. Both the weight and the float tend to increase the metacentric height of the assembly so that the assembly is more stable and more resistant to swinging movements.

The guiding forces acting on the valve in Fig. 18 are essentially the same as in the case of Fig. 17.

*Fig. 19*

This figure illustrates that the principles of the invention may be applied to a valve 100 cooperating with a nozzle 101, both of which are completely submerged. The valve and the nozzle are located in a lower tank 102 and are supplied with liquid from an upper tank 103. The valve is attached at its center to a hollow stem 104 which extends upwardly through the nozzle and has its upper end attached to and communicating with the interior of a cylinder 105. The water level within the cylinder 105 is the same as that in the tank 102, so that the valve 100 is operated in accordance with the difference in levels in the two tanks.

The guiding action of this valve is the same as in the case of the valves of Figs. 7 and 17. The lower tank 102 must have sufficiently large lateral dimensions so that no lateral reaction or turbulence occurs adjacent to valve 100 to disturb the guiding action.

I claim:

1. A low friction valve, comprising a vertically directed nozzle of circular cross-section opening into a space, a circular valve member having a diameter greater than the smallest diameter of the nozzle opening, means supporting said valve member on the discharge side of the nozzle and in substantial vertical alignment therewith, said valve member having a surface facing the nozzle which is symmetrical with respect to the valve center, said valve member also having a normal position in which the nozzle axis intersects the center of said valve surface, said supporting means including means for accommodating a substantial range of swinging movement of said valve member from its normal position in any lateral direction, means for limiting the swinging movement of the valve member so that at its maximum swing from said normal position at least a substantial portion of the nozzle opening lies within the vertical projection of the valve member periphery, and low friction means including said supporting means for moving said valve member vertically toward and away from said nozzle to control the flow of fluid therefrom, the jet of fluid discharged from the nozzle when the valve member is spaced therefrom exerting a resultant thrust on the valve member acting at the center of that portion of the valve member which is aligned with the nozzle and in a direction parallel to the mean perpendicular to that surface portion, said supporting means being connected to the valve member symmetrically with respect to the valve axis and exerting on said valve member a resultant reactive force acting at the center of the valve member and along its axis, said thrust and said reactive force acting at spaced points on the valve member when the valve member is swung laterally from its normal position, so that the thrust and the reactive force then comprise a couple tending to restore the valve member to said normal position, said space having dimensions sufficiently great so that the flow of fluid discharged from said opening is substantially undisturbed and said restoring couple is unopposed by forces due to such disturbance.

2. A valve as defined in claim 1, in which the space into which said nozzle opens is the atmosphere.

3. A valve as defined in claim 1, in which the supporting means is above the valve member, and said valve member is biased by gravity to its normal position.

4. A valve as defined in claim 1, in which said means for accommodating the swinging movement of the valve member comprises universal joint means.

5. A valve as defined in claim 1, in which said means for accommodating the swinging movement of said valve comprises a flexible member attached at one end to a fixed member and at the other end to said supporting means for said valve member.

6. A valve as defined in claim 4, in which said universal joint means comprises at least one universally movable pivot, and said supporting means also includes stem means connecting said pivot to said valve member, said valve member being spaced a substantial distance from said support so that said restoring couple has a substantial mechanical advantage over frictional forces acting at said pivot.

7. A valve as defined in claim 1, in which said valve member has a concave surface on the side toward said nozzle, said concave surface being concentric with the nozzle axis when said valve member is in its normal position.

8. A valve as defined in claim 7 in which said means for accommodating swinging movement comprises a float at least partially submerged in a buoyant fluid and tiltable and horizontally translatable therein, and said supporting means also comprises a stem connecting said float to said valve member.

9. A valve as defined in claim 1, in which said valve member has the form of a plate with a flat surface facing said nozzle.

10. A valve as defined in claim 1, in which said valve member has a concave surface of arcuate vertical cross-section facing said nozzle.

11. A valve as defined in claim 1, in which said valve member has a concave conical surface facing said nozzle.

12. A valve as defined in claim 1, in which said valve member is cup-shaped, with the open end of the cup facing said nozzle.

13. A valve as defined in claim 1, in which said supporting means includes a single stem attached to the center of the valve member and aligned with the axis of the valve member.

14. A valve as defined in claim 1, in which said supporting means is above the valve member and comprises a plurality of flexible elements attached to points symmetrically spaced from the center of the valve member.

15. A valve as defined in claim 1, in which the end of the nozzle is horizontal and symmetrical with respect to the nozzle axis, so that when said valve member is spaced from the nozzle and in said normal position, the nozzle and valve member cooperate to define a lateral discharge opening extending about the nozzle periphery and having the same radial contour throughout the nozzle periphery so that the fluid discharged produces no net lateral thrust on the valve member, said surface of said valve member being flat and horizontal when the valve member is in said normal position, said valve member being swingable about a center spaced from the valve member on the opposite side thereof from the nozzle and substantially aligned with the nozzle axis, said valve member and said nozzle cooperating when said valve member is swung away from said normal position to make said discharge opening radially divergent on the side toward which the valve member is swung and radially convergent on the opposite side, so that the fluid discharging through the convergent and divergent portions of the opening produces a thrust on the valve member tending to restore it to its normal position.

16. A low friction valve, comprising a vertically directed nozzle of circular cross-section opening into a space, and having an end portion whose periphery is symmetrical about the nozzle axis, a valve member of circular periphery having a diameter greater than the smallest diameter of the nozzle opening and having a flat surface, means movably supporting said valve member on the discharge side of said nozzle for a substantial range of universal swinging movement in any lateral direction from an intermediate position wherein said valve member is in vertical alignment with the nozzle and said flat surface is horizontal, means for limiting the swinging movement of the valve member so that at its maximum swing from said intermediate position at least a substantial portion of the nozzle opening lies within the vertical projection of the valve member periphery, and low friction means including said supporting means for moving said valve member vertically toward and away from the nozzle to control the flow of fluid therefrom, said valve member cooperating with said nozzle when spaced therefrom to define a lateral discharge opening extending about the periphery of the nozzle through which fluid may be discharged into said space, said discharge opening having the same radial contour throughout the nozzle periphery when said valve member is in said intermediate position so that the fluid discharged produces no net lateral thrust on the valve member, said valve member and said nozzle cooperating when said valve member is swung away from said intermediate position to make said discharge opening wider on the side toward which the valve member is swung and narrower on the opposite side, so that the fluid discharging through said wider and narrower portions of the opening produces a thrust on said valve member in a direction tending to restore it to its normal position, said space having dimensions sufficiently great so that the flow of fluid discharged from said opening is substantially undisturbed and said restoring thrust is unopposed by forces due to such disturbance.

17. A low friction valve mechanism, comprising a vertically directed nozzle, a valve having a rigid valve surface on which said nozzle impinges and cooperating therewith to control the flow of fluid therefrom, said valve when open being mechanically free to have considerable lateral movement in any direction but adapted to be restored in vertical alignment with said nozzle by the action of fluid escaping through said nozzle and impinging on said rigid valve surface, a low friction valve operator to open and close said valve, and a low friction connection between said operator and said valve.

18. A low friction valve, comprising a vertically directed nozzle of circular cross-section opening into a space and having an end portion whose periphery is symmetrical about the nozzle axis, a valve member of circular periphery having a diameter greater than the smallest diameter of the nozzle opening and having an end plate located in one plane, means movably supporting said valve member on the discharge side of said nozzle for a substantial range of universal swinging movement in any lateral direction from an intermediate position wherein said valve member is in vertical alignment with the nozzle and said end plate is horizontal, means for limiting the swinging movement of the valve member so that at its maximum swing from said intermediate position, at least a substantial portion of the nozzle opening lies within the vertical projection of the valve member periphery, and low friction means including said supporting means for moving said valve member vertically toward and away from the nozzle to control the flow of fluid therefrom, said valve member cooperating with said nozzle when spaced therefrom to define a lateral discharge opening extending about the periphery of the nozzle through which fluid may be discharged into said space, said discharge opening having the same radial contour throughout the nozzle periphery when said valve member is in said intermediate position so that the fluid discharged produces no net lateral thrust on the valve member, said valve member and said nozzle cooperating when said valve member is swung away from said intermediate position to make said discharge opening wider on the side toward which the valve member is swung and narrower on the opposite side, so that the fluid discharging through said divergent and convergent portions of the opening produces a thrust on said valve member in a direction tending to restore it to its normal position, said space having dimensions sufficiently great so that the flow of fluid discharged from said opening is substantially undisturbed and said restoring thrust is unopposed by forces due to such disturbance.

19. A low friction valve, comprising a vertically directed nozzle of circular cross-section opening into a space, a circular valve member having a diameter greater than the smallest diameter of the nozzle opening, means supporting said valve member on the discharge side of the nozzle and in substantial vertical alignment therewith, said valve member having a normal position in which the nozzle axis intersects the center of the periphery of said circular valve member, said supporting means including means for accommodating a substantial range of swinging movement of said valve member from its normal position in any lateral direction, means for limiting the swinging movement of the valve member so that at its maximum swing from said normal position at least a substantial portion of the nozzle opening lies within the vertical projection of the valve member periphery, and low friction means including said supporting means for moving said valve member vertically toward and away from said nozzle to control the flow of fluid therefrom, the jet of fluid discharged from the nozzle when the valve member is spaced therefrom exerting a resultant thrust on the valve member acting transverse to the line of vertical movement of said valve member, said supporting means being connected to the valve member symmetrically with respect to the valve axis and exerting on said valve member a resultant reactive force acting at the center of the valve member and along its axis, said thrust and said reactive force acting at spaced points on the valve member when the valve member is swung laterally from its normal position, so that the thrust and the reactive force then comprise a couple tending to restore the valve member to said normal position, said space having dimensions sufficiently great and being so shaped that said restoring couple is unopposed by forces due to fluid discharge disturbance.

20. A valve as defined in claim 15 in which said nozzle opening includes vertically extending walls and said valve member is supported above said nozzle.

21. A low friction valve, comprising a vertical upwardly directed nozzle of circular cross-section opening into a space, an elongated cylinder valve member open at both ends and having a diameter greater than the smallest diameter of the nozzle opening, said valve member being longer than the pressure head within the nozzle so that fluid issuing from the nozzle when open must pass radially out below said valve member, means supporting said valve member on the discharge side of the nozzle and in substantial vertical alignment therewith, said valve member having a normal position in which the nozzle axis intersects the center of the periphery of said valve member, said supporting means including means for accommodating a substantial range of swinging movement of said valve member from its normal position in any lateral direction, means for limiting the swinging movement of the valve member so that at its maximum swing from said normal position at least a substantial portion of the nozzle opening lies within the vertical projection of the valve member periphery, and low friction means including said supporting means for moving said valve member vertically toward and away from said nozzle to control the flow of fluid therefrom, said valve member adapted to be restored in vertical alignment with said nozzle by the action of fluid escaping through said nozzle and impinging on the cylindrical walls thereof.

References Cited in the file of this patent

UNITED STATES PATENTS

| | | |
|---|---|---|
| 538,802 | Sullivan | May 7, 1895 |
| 755,000 | Hedberg | Mar. 22, 1904 |
| 791,382 | Turro | May 30, 1905 |
| 800,340 | Thorn | Sept. 26, 1905 |
| 977,807 | Land | Dec. 6, 1910 |
| 1,032,704 | Risberg | July 16, 1912 |
| 1,175,253 | Fulton | Mar. 14, 1916 |
| 1,311,830 | Mohr | July 29, 1919 |
| 1,349,267 | Craig | Aug. 10, 1920 |
| 1,477,393 | Stump | Dec. 11, 1923 |
| 1,799,667 | Ziegler | Apr. 7, 1931 |
| 1,906,313 | Clifford | May 2, 1933 |
| 1,915,716 | Bradshaw | June 27, 1933 |
| 1,934,314 | Lawler | Nov. 7, 1933 |
| 2,200,091 | Kovach | May 7, 1940 |
| 2,299,707 | Svirsky | Oct. 20, 1942 |
| 2,352,249 | Briggs | June 27, 1944 |
| 2,479,688 | Lindgren | Aug. 23, 1949 |
| 2,646,060 | Ponsar | July 21, 1953 |

FOREIGN PATENTS

| | | |
|---|---|---|
| 538,124 | Great Britain | July 22, 1941 |